United States Patent
Kashima et al.

[15] 3,662,568
[45] May 16, 1972

[54] FLEXIBLE COUPLING

[72] Inventors: Takeshiro Kashima, Kanagawaken; Isamu Onaya, Chibaken, both of Japan

[73] Assignee: Pacific Metals Co. Ltd., Tokyo, Japan

[22] Filed: Feb. 16, 1971

[21] Appl. No.: 115,602

[52] U.S. Cl. ..................................................64/13, 64/14
[51] Int. Cl. ..........................................................F16d 3/78
[58] Field of Search ..........................................64/11, 13, 14, 16

[56] References Cited

UNITED STATES PATENTS

| | | | |
|---|---|---|---|
| 2,943,464 | 7/1960 | Voges | 64/14 |
| 2,996,900 | 8/1961 | Fermier | 64/14 |
| 3,396,556 | 8/1968 | Giegerich | 64/14 |

*Primary Examiner*—Kenneth W. Sprague
*Attorney*—Wenderoth, Lind & Ponack

[57] ABSTRACT

In a flexible coupling composed of two coupling halves and an intermediate elastic ring inserted between the two coupling halves, the improvements that each of said two coupling halves has on its inside surface claws of height equivalent to half of the thickness of said intermediate ring and that said intermediate ring is provided with plurality of openings of same shape as the cross section of said claws.

3 Claims, 7 Drawing Figures

TAKESHIRO KASHIMA
ISAMU ONAYA
INVENTORS

FLEXIBLE COUPLING

The present invention relates to a flexible coupling.

In case of a flexible coupling with an intermediate elastic ring of rubbery material, torque is transmitted through the elastic body. It is well known that the torque is transmitted as the elastic body produces compression deformation or twisting deformation. The flexible coupling according to the present invention is of the type where the torque is transmitted through the twisting deformation, but is of new structure different from the conventional structures.

The present invention shall be described referring to the attached drawings all showing embodiments of the present invention.

Figure 1:
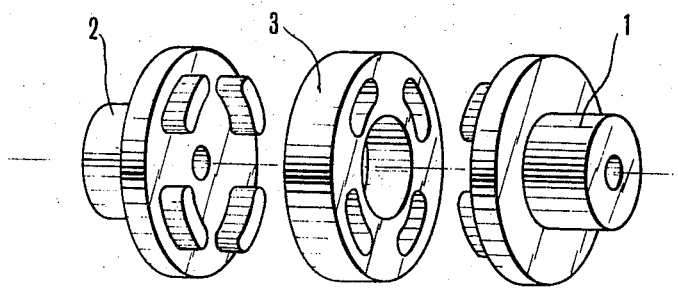
Figure 2:
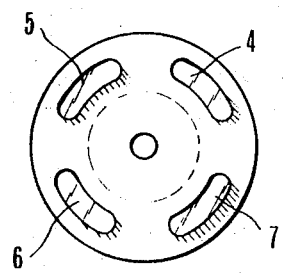
Figure 3:
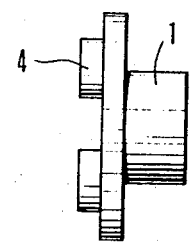
Figure 4:
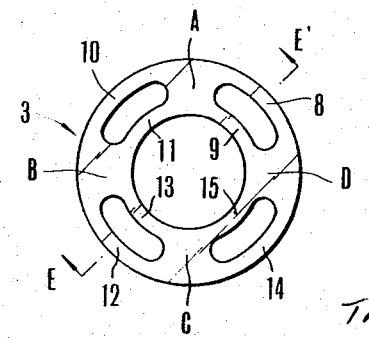
Figure 5:
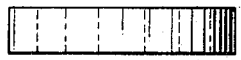
Figure 6:
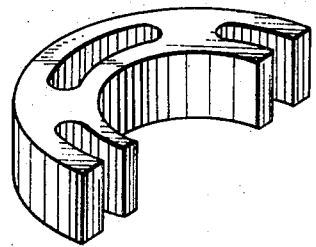
Figure 7:
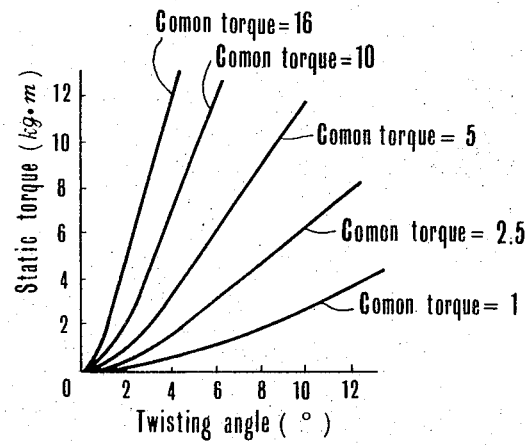

FIG. 1 shows the whole assemble of the coupling.
FIG. 2 shows a plane view of the coupling half.
FIG. 3 shows a side view of the coupling half.
FIG. 4 shows a plane view of the intermediate ring.
FIG. 5 shows a side view of the intermediate ring.
FIG. 6 shows a cross-sectional slant view along the line of E—E in FIG. 4.
FIG. 7 is a graph showing static torque characteristics of the present coupling.

As shown in FIG. 1, the coupling according to the present invention comprises two opposing steel coupling halves (1) and (2) and one intermediate ring (3) therebetween. The two coupling halves (1) and (2) have shapes as shown by (4), (5), (6) and (7) in FIG. 2 and each of the halves has four claws of height equivalent to half of the width of the intermediate elastic ring. These claws engage into four oblong openings through the intermediate ring shown in FIG. 4, so as to assemble the three members closely as shown in FIG. 1.

Therefore, in the present inventive coupling, the torque transmission is effected through the twisting moment acting in a circumferential direction between the four claws and the intermediate ring, and in this case, shearing strain is produced in the rubber portions A, B, C and D in FIG. 4, but the outer ring composed of the portions (8) (10) (12) and (14) and the inner ring of (9) (11) (13) and (15) of intermediate ring serve to prevent rotational twisting in a radial direction in the portions of A, B, C and D, so that thrust in an axial direction can be minimunized. When polyurethane rubber is used for the intermediate ring, slippage in an axial direction can be effectively prevented because larger compression strain is obtained than when other synthetic rubber is used. However, the elastic intermediate ring may be of methane rubber, nitrile rubber and other synthetic rubber as well as natural rubber.

Thrust in the above case is very small in respect to the twisting angle within a prescribed torque (common torque less than 15°; maximum impact torque less than 15°) so that there is no danger of damaging the machine, and good vibration absorption is assured by the deformation of the elastic rubber. Static torque characteristics of the present inventive coupling are as shown in FIG. 7 and twisting angles and corresponding axial deformation degrees of an intermediate elastic ring of polyurethane rubber are shown in Table 1. The deformation degrees are deformation rates of the side surface of the intermediate ring caused by twisting.

TABLE 1

| Twisting Angle | Deformation Degree |
|---|---|
| 5° | less than 0.5% |
| 10° | less than 0.8% |
| 15° | less than 1% |

Although the ordinary torque of the coupling is less than 5° and the maximum impact torque in view of load coefficient is less than 15°, impact speed and deformation speed are not proportional to each other due to the deformation resistance of the rubber because the impact torque is imposed instantaneously. Therefore, the deformation degree in case of the twisting angle of 15° in Table 1 may take a smaller value in actual cases. Namely, when a specific rubber material is used within a prescribed twisting angle, the thrust in an axial direction can be minimized with the aid of the outer ring (8)-(10)-(12)-(14) and the inner ring (9)-(11)-(13)-(15) of the intermediate elastic ring, and at the same time the functions and life of the coupling are well maintained by the special structure.

Differences in working properties between the present invention and other conventional couplings are comparatively shown in the following example.

Example

Various types of couplings within the same torque range were used in a single-cylinder Robin engine of 7 HP and 3,000 r.p.m. and their durability and fatigue were tested and results are shown under.

Compression-type coupling: the elastic rubber or the leather were remarkably worn and destroyed at 18.5 hrs.

Twisting-type coupling: severe vibration was caused and broken at 7.5 hrs.

Inventive coupling : compression strain was caused at the contacting portion between the claw and the intermediate elastic ring, but no problem took place even at 120 hrs.

What is claimed is:

1. In a flexible coupling composed of two coupling halves and an intermediate elastic ring inserted between the two coupling halves, the improvements that each of said two coupling halves has on its inside surface claws of height equivalent to half of the thickness of said intermediate ring and that said intermediate ring is provided with plurality of openings of same shape as the cross section of said claws.

2. A flexible coupling according to claim 1 in which four claws are provided equally spaced from each other around the center of the inside surface of each of said two coupling halves.

3. A flexible coupling according to claim 1 in which the elastic intermediate ring is of material selected from group consisting of polyurethane rubber, urethane rubber, nitrile rubber and natural rubber.

* * * * *